United States Patent [19]

Huber

[11] Patent Number: 5,373,389
[45] Date of Patent: Dec. 13, 1994

[54] METHOD FOR LINEARIZING AN UNBALANCED MACH ZEHNDER OPTICAL FREQUENCY DISCRIMINATOR

[75] Inventor: David R. Huber, Warrington, Pa.

[73] Assignee: General Instrument Corporation, Hatboro, Pa.

[21] Appl. No.: 967,207

[22] Filed: Oct. 27, 1992

[51] Int. Cl.$^5$ .............................................. H04B 10/00
[52] U.S. Cl. .................................... 359/195; 359/173; 359/188; 359/193; 359/239
[58] Field of Search ............... 359/161, 180, 187, 188, 359/173, 182, 3, 239, 278, 189, 193, 194, 195; 385/9, 3

[56] References Cited

U.S. PATENT DOCUMENTS

| | | | |
|---|---|---|---|
| 3,597,755 | 8/1971 | Parkin | 359/112 |
| 4,928,007 | 5/1990 | Fürstenau | 356/345 |
| 4,955,086 | 9/1990 | Kindt | 359/170 |
| 5,166,821 | 11/1992 | Huber | 359/181 |
| 5,187,713 | 2/1993 | Kwa | 372/26 |
| 5,191,459 | 3/1993 | Thompson | 359/154 |
| 5,276,543 | 1/1994 | Olshansky | 359/124 |

OTHER PUBLICATIONS

Donaldson, "Linearity Considerations in High Performance Amplitude Modulators", IEEE Colloquium on Analog Optical Communications, DIG. #156 pp. 4/1-5, Dec. 1992.

*Primary Examiner*—Leslie Pascal
*Attorney, Agent, or Firm*—Barry R. Lipsitz

[57] ABSTRACT

An unbalanced Mach Zehnder optical frequency discriminator is linearized to suppress third order nonlinear distortion. An optical carrier that is modulated in optical frequency is input to an unbalanced Mach Zehnder interferometer to discriminate RF information signals carried on the carrier. The Mach Zehnder interferometer has an adjustable operating point. The operating point is adjusted to a point where the output intensity of the Mach Zehnder interferometer is no more than about ten percent of its maximum value. In order to avoid problems with second order distortion, the optical carrier is modulated with RF signals that do not occupy more than a single octave. The operating point of the device can be adjusted by adjusting an electrical bias thereof, by adjusting the wavelength of the optical carrier, or by adjusting the temperature of the device.

20 Claims, 2 Drawing Sheets

METHOD FOR LINEARIZING AN UNBALANCED MACH ZEHNDER OPTICAL FREQUENCY DISCRIMINATOR

BACKGROUND OF THE INVENTION

The present invention relates to the communication of optical frequency modulated signals over an optical communication path and more particularly, to the reception and demodulation of amplitude modulated video signals from an optical fiber link. The invention has particular applicability to the reception of video signals in an optical fiber cable television system.

Recently, there has been a growing interest in the development of analog optical communication systems. In comparison with digital systems, analog communication systems provide an efficient use of bandwidth. This is particularly useful in cable television (CATV) transmission system applications, where it is necessary to transmit a large number of video channels through an optical fiber. Compatibility with existing equipment is achieved by using the same amplitude modulated vestigial-sideband (AM-VSB) signal format for optical transmission that is in use for coaxial cable signal transmission.

The use of a television signal comprising AM-VSB video subcarriers is preferred in the distribution of cable television signals due to the compatibility of that format with National Television System Committee (NTSC) television standards and the ability to provide an increased number of channels within a given bandwidth. An undesirable characteristic of AM-VSB transmission is that it requires a much higher carrier-to-noise ratio (CNR) than other techniques, such as frequency modulation or digital transmission of video signals. Generally, a CNR of at least 40 dB is necessary to provide clear reception of AM-VSB television signals.

In order to transmit an information signal (e.g., a television signal) over an optical fiber, a light beam ("carrier") must be modulated by the information signal. Certain types of lasers providing optical carriers can be directly modulated, as well known in the art. Alternatively, external modulation of a laser beam can be provided. Each of these approaches has well known advantages and disadvantages.

To date, commercial deployment of fiber optic analog multichannel communications systems has been dominated by directly modulated laser source technology. Although there are potential benefits with external modulation of a continuous wave (CW) laser source, external modulators such as Mach Zehnder waveguide modulators (interferometers) are highly nonlinear. This characteristic poses severe limitations on the dynamic range that can be achieved in analog communication systems. On the other hand, external modulator links can be designed which virtually eliminate frequency chirping and which can be used with high power shot noise limited solid state lasers. Thus, the development of optical communication systems using external modulators would be advantageous, if the disadvantages of prior art external modulation techniques can be overcome.

Most optical components are capable of reciprocal operation. A Mach Zehnder modulator, in particular, can be used both to modulate signals onto a carrier and to discriminate (i.e., demodulate) signals from a carrier, if the device is provided in an unbalanced form. It is known, for example, that an unbalanced Mach Zehnder modulator will discriminate optical frequency modulation (FM). However, to date it has been difficult to optically discriminate optical frequency modulation in this manner, due to the limited dynamic range over which the linearity of the Mach Zehnder modulator is sufficient for communication links that require very linear operation. In particular, multichannel video is an application that requires a very linear demodulator.

A Mach Zehnder modulator has an operating characteristic (intensity versus frequency) that follows a cosine$^2$ curve. Typically, the Mach Zehnder modulator is biased to operate at quadrature, which is the point where the output intensity of the device is at 50% of its maximum value. This point is centered within an approximately linear region of the cosine$^2$ curve.

Frequency modulation of AM signals over an optical communication path has several advantages. For example, FM communication has much lower CNR and distortion product requirements. Multiple channel video transmission has been demonstrated using individual subcarriers for each of a plurality of FM modulated video channels. Practical optical FM discriminators are necessary, however, in order to demodulate the AM information signals from the frequency modulated optical carrier. Although an unbalanced Mach Zehnder discriminator would be useful in demodulating such signals, it is necessary to improve the dynamic range of such a discriminator in order to provide a practical system.

It would be advantageous to provide a method for linearizing an unbalanced Mach Zehnder optical frequency discriminator. It would be further advantageous to provide such a method that effectively suppresses third order nonlinear distortion introduced by the discriminator. It would also be advantageous to provide such a method that avoids signal degradation due to second order nonlinearities. The present invention provides methods enjoying the aforementioned advantages.

SUMMARY OF THE INVENTION

In accordance with the present invention, greater dynamic range is achieved in an unbalanced Mach Zehnder optical frequency discriminator by modifying the operating point of the discriminator to a point that is well below the standard quadrature bias point. Poor second order performance is overcome by limiting the frequency range of a plurality of input signals to one octave.

More particularly, a method is provided for linearizing an unbalanced Mach Zehnder optical frequency discriminator to suppress third order nonlinear distortion. An optical carrier that is modulated in optical frequency is input to an unbalanced Mach Zehnder interferometer to discriminate RF information signals carried on the carrier. The operating point of the Mach Zehnder interferometer is adjusted to a point where the output intensity thereof is no more than about ten percent of its maximum value. In a preferred embodiment, the operating point of the Mach Zehnder interferometer is adjusted to a point where the output intensity is about five percent of its maximum value. In order to overcome the effects of second order distortion, the optical carrier is modulated with RF signals that do not occupy more than a single octave. To further improve the performance of the discriminator, the optical carrier is modulated only in optical frequency. By limiting the modulation of the optical carrier to frequency modulation, undesirable effects of optical amplitude (i.e., intensity) modulation are avoided.

In one embodiment, the step of adjusting the operating point of the Mach Zehnder interferometer comprises the step of electrically biasing the interferometer. In another embodiment, the adjustment is achieved by adjusting the temperature of the interferometer. In a third embodiment, the operating point is adjusted by adjusting the frequency of the optical carrier.

DETAILED DESCRIPTION OF THE INVENTION

Figure 4:
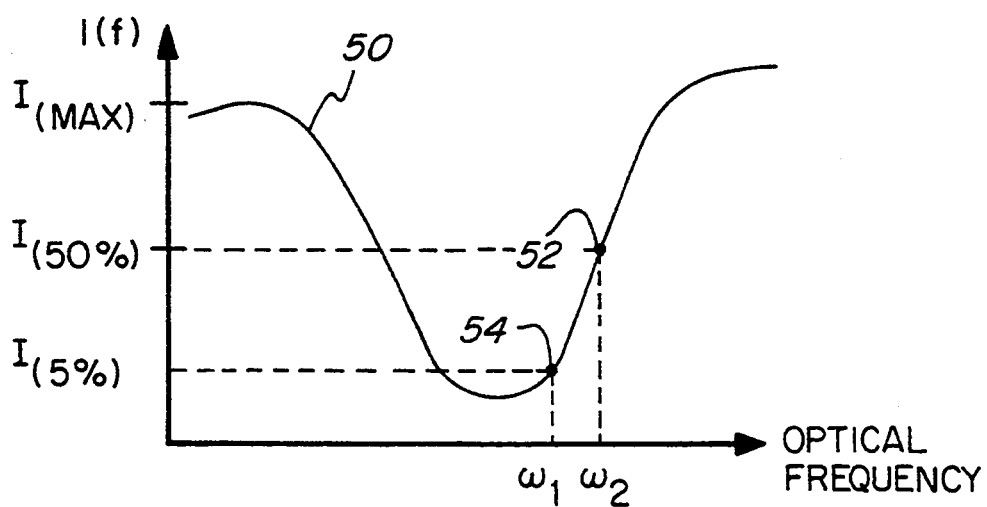
FIG. 4 is a graph illustrating the operating characteristic of a Mach Zehnder interferometer.

Mach Zehnder interferometers suffer from substantial intermodulation distortions when used to modulate or demodulate AM information signals. In order to overcome second order nonlinear distortions, Mach Zehnder interferometers have typically been biased at 50% optical modulation depth (OMD) which corresponds to operation at the quadrature point of the interferometer operating characteristic. A plot (not to scale) illustrating the operating characteristic 50 of a Mach Zehnder interferometer is provided in FIG. 4. As illustrated, the quadrature operating point 52 corresponds to an optical frequency $\omega_2$ and an output intensity that is 50% of the maximum value. As FIG. 4 shows, quadrature point 52 resides in the middle of a fairly linear range of operation of the interferometer.

For applications that require only a single octave bandwidth, e.g., from 300 MHz to 600 MHz, second order distortion is not a factor and only third order nonlinearities must be addressed. This assumes, of course, that higher order distortions are negligible.

It has been found that third order nonlinear distortion of a Mach Zehnder interferometer can be suppressed by more than 20 dB when the interferometer is operated with a low optical bias (i.e., well below the 50% OMD that is conventional). At a five percent optical bias (where the output intensity of the interferometer is five percent of its maximum value), it has been found that third order composite distortion and carrier-to-noise performance are suitable for the delivery of VSB-AM signals in cable television applications. Such an operating point 54 is illustrated in FIG. 4, and corresponds to an optical frequency of $\omega_1$.

In experiments run during the development of the present invention, an erbium glass laser operating at 1556 nm with an output power of +16 dBm was used to provide a carrier that was input to a Mach Zehnder modulator. The laser had a relative intensity noise (RIN) of −170 dB/Hz. A receiver was used with a responsivity of 0.9 A/W and noise was 8.5 pA/$\sqrt{Hz}$. The largest noise present was shot noise. Receiver thermal noise was about 3 dB lower than the shot noise. The Mach Zehnder modulator was designed for digital modulation applications and had 6 dB ripple in the amplitude response over a 40 channel band having RF subcarriers ranging from 313.25 MHz to 547.25 MHz. One carrier located at 421.25 MHz was defective and was turned off, leaving 39 carriers within a single octave for use in modulating the optical carrier.

Composite triple beat distortion (CTB) was compared for the Mach Zehnder modulator biased at 50% OMD and 5% OMD. The modulation index was $m_i=4.4\%$ and $m_i=5.1\%$ at 313.25 MHz and 547.25 MHz, respectively. The optical power detected was −3 dBm. The measured CNR was 55 dB for the channel which was set for $m_i=4.4\%$. CTB was measured at 313.25, 361.25, 481.25 and 535.25 MHz. For the case with bias set at 50% a worst case CTB of −40 dBc was obtained. For the case with 5% bias, worst case CTB was −64 dBc.

The same experimental conditions used to compare CTB were used to compare two tone third order distortion products. The worst case distortion product for the case with bias set at 50% was −66 dBc. The worst case distortion product with bias set at 5% was −90 dBc. Although the modulator attenuated the optical output signal by an additional 10 dB at five percent bias when compared to conventional operation at quadrature (50% bias), the scheme was found to be very robust as it was insensitive to small changes in bias voltage.

Since a Mach Zehnder interferometer is a reciprocal device, and in unbalanced form can be utilized as an optical frequency discriminator, linearization of such a discriminator is achieved using the same technique of operating the Mach Zehnder interferometer below quadrature.

Figure 1:
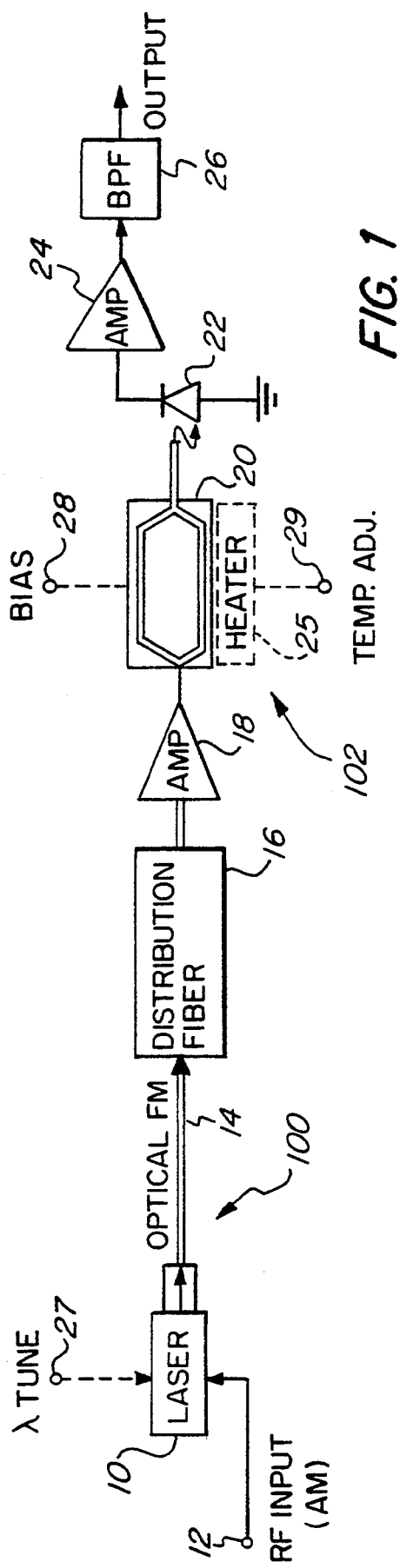
FIG. 1 is a block diagram illustrating a first embodiment of the present invention, in which a laser is directly modulated with an information signal to be communicated.

FIG. 1 illustrates one embodiment of an optical communication system comprising a transmitter generally designated 100 and receiver generally designated 102 that are coupled by a distribution fiber 16. Transmitter 100 comprises a laser 10 such as a distributed feedback (DFB) or distributed Bragg reflector (DBR) laser that is directly modulated by amplitude modulated RF information signals input to terminal 12. The frequency modulated optical carrier output from laser 10 is communicated via optical path 14 to distribution fiber 16 which carries the modulated carrier to receiver 102. The receiver includes a conventional optical amplifier 18 which amplifies the received optical signal for input to an unbalanced Mach Zehnder interferometer 20. In accordance with the present invention, Mach Zehnder interferometer 20 is adjusted such that it operates at a point where its output intensity is no more than about ten percent of its maximum value at the center frequency of the optical carrier output by laser 10.

The operating point of Mach Zehnder interferometer 20 can be adjusted in various ways. For example, the frequency of laser 10 can be tuned by a control signal input at terminal 27 to provide a center frequency $\omega_1$ that corresponds to the desired operating point (e.g., point 54 shown in FIG. 4) of the Mach Zehnder interferometer. Alternatively, the interferometer can be biased with a DC voltage input at terminal 28 to set the desired operating point of the device. Another technique for setting the operating point of the Mach Zehnder interferometer is to adjust the temperature of the optical substrate (e.g., lithium niobate) in which the interferometer is fabricated. This can be accomplished by controlling the input voltage to a heater 25 mounted adjacent the substrate. The control voltage is input to terminal 29.

The optical output of the Mach Zehnder interferometer 20 will comprise optical intensity modulation carrying the AM information signals originally input to terminal 12. A photodetector 22 receives the intensity modulation and converts it to the electrical domain in a conventional manner. The electrical signal is amplified in a conventional amplifier 24 and filtered by a bandpass filter 26 for output to a conventional AM demodulator (not shown). The demodulated AM signals can then be reproduced by a television set or the like in a conventional manner.

Figure 2:
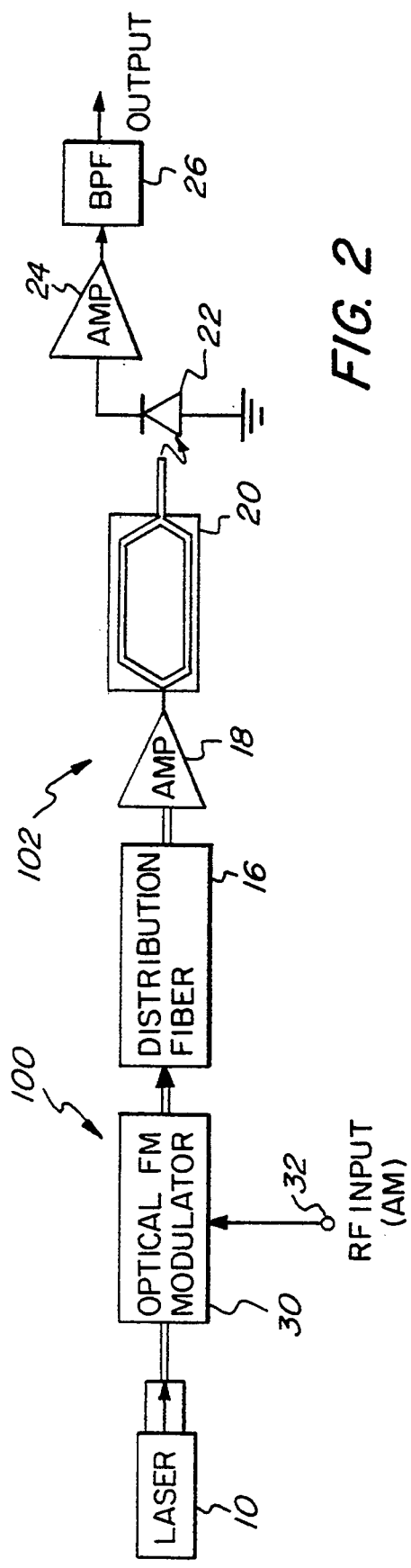
FIG. 2 is a block diagram of an alternate embodiment in which a carrier output by a laser is externally modulated with an information signal.

FIG. 2 illustrates an alternate embodiment of transmitter 100 wherein the amplitude modulated RF information signals are externally modulated onto the carrier output from laser 10. For this purpose, an external optical FM modulator 30 is provided. The information signals that are used to modulate the carrier are input to the optical FM modulator via terminal 32. Optical FM modulator 30 can comprise any such external modulator well known in the art.

Figure 3:
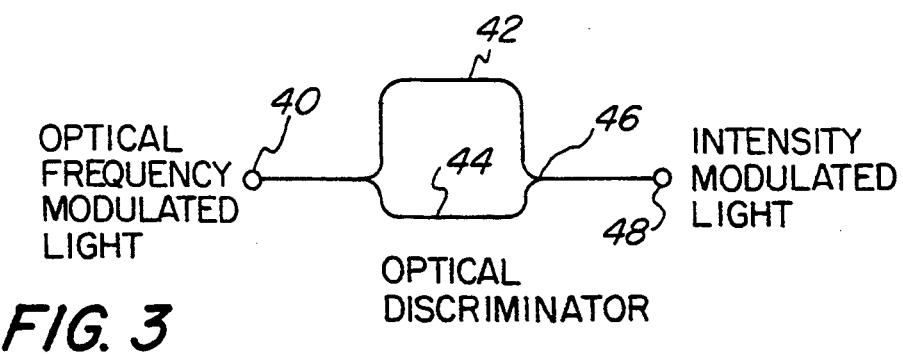
FIG. 3 is a schematic illustration of an unbalanced Mach Zehnder optical frequency discriminator.

An unbalanced Mach Zehnder interferometer used as an optical discriminator is illustrated in schematic form in FIG. 3. Optical frequency modulated light, such as from distribution fiber 16 (FIG. 1 or 2) is input to terminal 40. The input light is split into two paths 42 and 44 of unequal length. Since path 42 is longer than path 44, a small delay will be introduced into the optical signal carried by path 42 with respect to that carried by path 44. The paths are combined in an interferometer 46 and the resultant output signal at terminal 48 comprises intensity modulated light carrying the original AM information signals input to the transmitter. A further discussion of Mach Zehnder interferometer devices can be found in B. H. Verbeek, et al, "Integrated Four Channel Mach-Zehnder Multi/Demultiplexer Fabricated with Phosphorous Doped $SiO_2$ Waveguides on Si," *IEEE Lightwave Technology*, LT-6, p. 1011, 1988.

It should now be appreciated that the present invention provides a linearized optical frequency discriminator. The discriminator has an improved dynamic range over those previously proposed. The problem of second order distortion is overcome by using the discriminator to demodulate signals within a single octave. Optical loss can be compensated for by providing an optical amplifier as well known in the art. Preferably, only the optical frequency of the laser at the transmitter is modulated. This can be accomplished by directly modulating a multi element DFB or DBR laser diode as illustrated in FIG. 1 or by utilizing an external frequency modulator as illustrated in FIG. 2.

In a preferred embodiment, the operating point of the unbalanced Mach Zehnder interferometer used as a discriminator is adjusted to a point where the output intensity is no more than about ten percent of its maximum value. In a more specific embodiment, the operating point is adjusted to a point where the output intensity is about five percent of its maximum value.

Although the invention has been described in connection with various specific embodiments, those skilled in the art will appreciate that numerous adaptations and modifications may be made thereto without departing from the spirit and scope of the invention as set forth in the claims.

I claim:

1. A method for linearizing an unbalanced Mach Zehnder optical frequency discriminator to suppress third order nonlinear distortion when demodulating information from a frequency modulated optical carrier, comprising the steps of:

inputting an optical carrier that is modulated in optical frequency to an unbalanced Mach Zehnder interferometer to discriminate RF information signals carried on said carrier, said Mach Zehnder interferometer having an adjustable operating point; and adjusting said operating point to a point where the output intensity of said Mach Zehnder interferometer is no more than about 10% of its maximum value.

2. A method in accordance with claim 1 wherein the operating point of said Mach Zehnder interferometer is adjusted to a point where the output intensity is about 5% of its maximum value.

3. A method in accordance with claim 1 wherein said optical carrier is modulated with RF signals that do not occupy more than a single octave.

4. A method in accordance with claim 3 wherein said optical carrier is modulated only in optical frequency.

5. A method in accordance with claim 1 wherein said optical carrier is modulated only in optical frequency.

6. A method in accordance with claim 1 wherein said adjusting step comprises the step of electrically biasing said Mach Zehnder interferometer to set said operating point.

7. A method in accordance with claim 6 wherein the operating point of said Mach Zehnder interferometer is adjusted to a point where the output intensity is about 5% of its maximum value.

8. A method in accordance with claim 6 wherein said optical carrier is modulated with RF signals that do not occupy more than a single octave.

9. A method in accordance with claim 8 wherein said optical carrier is modulated only in optical frequency.

10. A method in accordance with claim 6 wherein said optical carrier is modulated only in optical frequency.

11. A method in accordance with claim 1 wherein said adjusting step comprises the step of adjusting the temperature of said Mach Zehnder interferometer to set said operating point.

12. A method in accordance with claim 11 wherein the operating point of said Mach Zehnder interferometer is adjusted to a point where the output intensity is about 5% of its maximum value.

13. A method in accordance with claim 11 wherein said optical carrier is modulated with RF signals that do not occupy more than a single octave.

14. A method in accordance with claim 13 wherein said optical carrier is modulated only in optical frequency.

15. A method in accordance with claim 11 wherein said optical carrier is modulated only in optical frequency.

16. A method in accordance with claim 1 wherein said adjusting step comprises the step of adjusting the frequency of said optical carrier to set said operating point.

17. A method in accordance with claim 16 wherein the operating point of said Mach Zehnder interferometer is adjusted to a point where the output intensity is about 5% of its maximum value.

18. A method in accordance with claim 16 wherein said optical carrier is modulated with RF signals that do not occupy more than a single octave.

19. A method in accordance with claim 18 wherein said optical carrier is modulated only in optical frequency.

20. A method in accordance with claim 16 wherein said optical carrier is modulated only in optical frequency.

* * * * *